Fig. I

INVENTORS
Sergio Galli DeParatesi
Carlo Rinaldini

United States Patent Office 3,406,093
Patented Oct. 15, 1968

3,406,093
CONTROL ROD SYSTEM FOR NUCLEAR POWER EXCURSION REACTORS
Sergio Galli de Paratesi and Carlo Rinaldini, Varese, Italy, assignors to European Atomic Energy Community—Euratom, Brussels, Belgium
Filed Apr. 12, 1966, Ser. No. 542,030
9 Claims. (Cl. 176—36)

ABSTRACT OF THE DISCLOSURE

A control system for affecting bi-directional, variable speed movement of control rods in the core of a nuclear reactor, especially adapted for use in reactors of the power excursion type.

Figure 1:
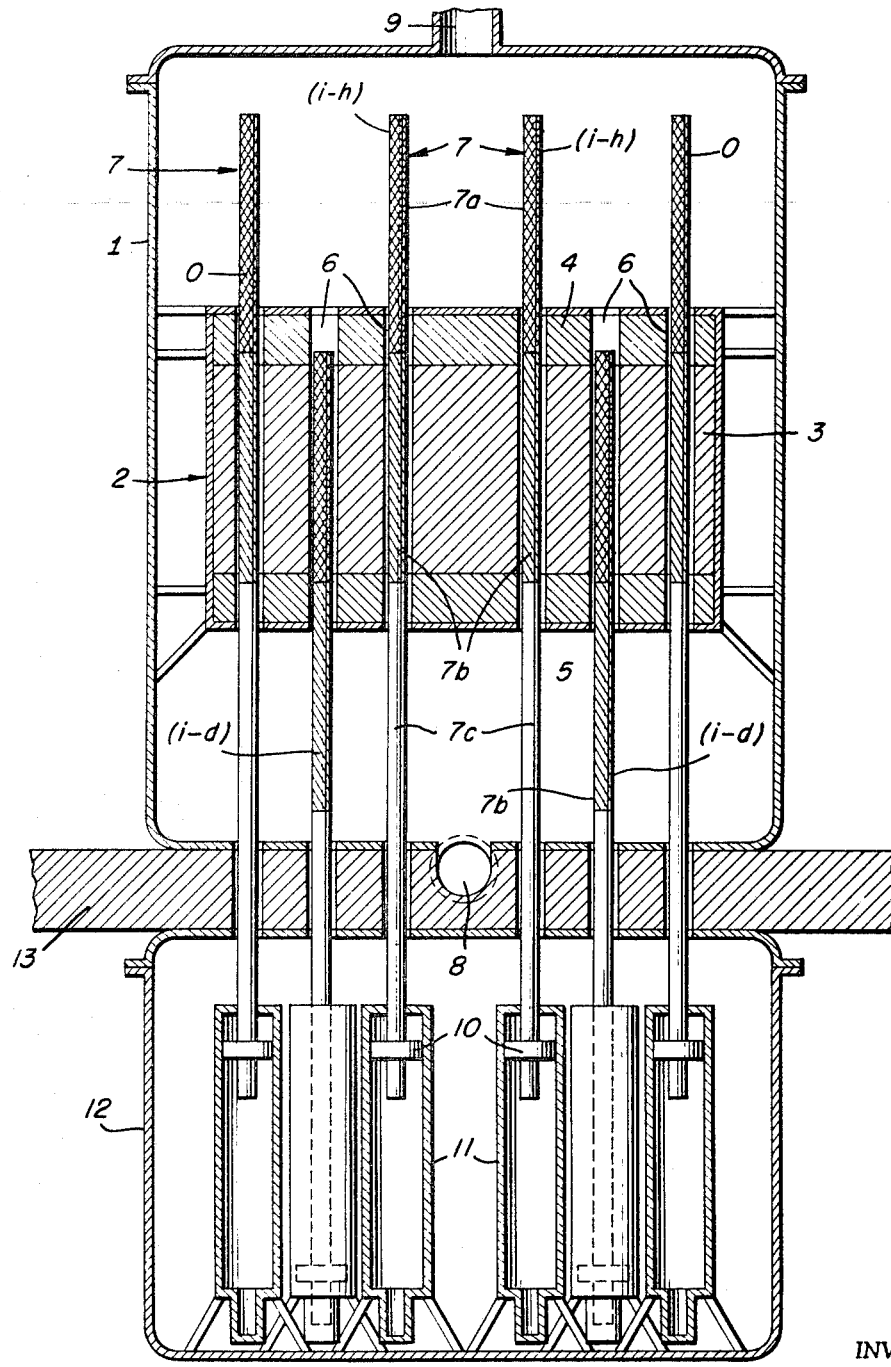

The main purpose of a power excursion reactor for safety tests is to make it possible to analyse the mechanism governing the failure of a fuel element of any reactor during some typical excursions. In particular, it is interesting to ascertain the extent of the failure and the amount of fission products which are released to the coolant and to the environment, which chemical reactions will take place among fuel, cladding and coolant when they are at very high temperature, and their scope: the modification of the geometry and of the properties of the fuel element and of the coolant channel as a result of the failure and of related phenomena.

The above tests require that the power excursion reactor should be able to produce inside the experimental region a very high neutron and gamma flux with a predetermined variation versus time.

A well know power excursion reactor of this kind is TREAT (Transient Reactor Test Facility) at Idaho, U.S.A. and which is specially designed to test fast reactor fuel elements.

TREAT is a homogeneous thermal graphite reactor in which all the energy produced during the excursion is stored in the heat capacity of the core itself. Cooling takes place only after the excursion by simple circulation of air.

The core of the TREAT reactor is disposed in an open vessel closed at the upper side by a removable cover. Each time a power excursion of a distinct type is to be carried out, the cover must be removed in order to allow manual intervention on the disposition of the control rods. The control rods are made up of two consecutive sections of different material, that is to say, one section is constituted of neutron moderating material, while the other is constituted of neutron absorbing material. All of the control rods are disposed at the upper side of the core with one of the said sections being inserted in the core. In order to insert the following section into the core, only an active movement farther downwards of the rods is provided. Thus, the reactor control is effected by a uni-directional active movement of the rods only.

Depending on the neutron flux transient to be initiated in the core, a certain number of control rods are disposed to have their neutron moderating section at the down side, while another number of control rods are disposed to have their neutron absorbing section at the down side. The rest of the control rods is acting as security rods to shut down the reactor in the case of emergency.

Thus, a power excursion is carried out in that the group of control rods with the absorbing section inserted in the core is pushed farther downwards, that is to say out of the core while the moderating section enters thereby injecting a positive amount of reactivity into the core. When the neutron flux peak achieves its predetermined upper value, the group of control rods with the moderating section inserted in the core is likewise pushed farther downwards, that is to say out of the core while the absorbing section enters thereby decreasing the neutron flux peak to normal critical (injection of negative reactivity).

Now, if in a consecutive experiment a greater or smaller amount of reactivity shall be injected into the core, the number of control rods with the neutron absorbing section downwards or correspondingly a number of the control rods with the neutron moderating downwards—must be turned around to have their neutron moderating section downwards—or correspondingly their neutron absorbing section downwards. The formerly downward sections are consequently upwards then.

In TREAT, this operation is carried out manually, in that the reactor cover is removed and the chosen control rods—after having been moved upwards—are attached to its drive mechanism in a sense opposite to the previous one.

In a nuclear power excursion reactor however, where large amounts of fission products and radiation are released into the coolant during the excursions, and where air as a coolant can no longer be applied, but must be replaced by some other convenient gas, for safety reasons, it is no longer admissible to open the reactor vessel in order to shift the control rods disposition. The problem is then how the controls disposition can be modified with the reactor vessel closed.

The present invention is concerned with this problem and discloses an operating system for the control rods— the latter ones always made up of the above mentioned neutron absorbing and neutron moderating section into two distinct groups—which allows by simple bi-directional movement of the rods each neutron flux transient chosen to be realized.

The operating system comprises also the drive mechanism pertaining to each control rod mechanism, which are equipped with push and pull spindles attached to the control rods.

According to the present invention all of the control rods are disposed at the same side of the reactor core and with the same sequence of the neutron sensitive sections, and are permanently attached to push-and-pull spindles penetrating into the reactor vessel from outside, and are guided in channels traversing the entire reactor core, the length of each neutron sensitive section corresponding to the height of the reactor core, and the stroke of the spindles—active in both directions—being adapted to this height in that at the extreme positions of the control rods, always one neutron sensitive section of the rods is entirely inserted in the core.

By this kind of organisation of the control rod system the disposition of the control rods necessary to carry out a chosen neutron flux transient can easily be adjusted by inserting some of the control rods (the first functional group) with its absorbing section into the reactor core, while others of the control rods (the second functional group) are inserted farther into the core with its moderating section in the core and with its absorbing sections outside the other side of the core. The rest of the control rods, preferably those disposed at the peripherical zone of the core, is inserted also with its moderating sections but serves for scram-action only.

A pulse like neutron flux peak is realized then by pushing the first functional group of the control-rods with its neutron moderating sections into the core, and extracting consecutively the second functional group of the control rods with its moderating section out of the core. Thus, inversely as is the case with TREAT, the reactor control is effected by a bi-directional active movement of the rods.

Other transient functions can easily be prepared in changing merely the pre-set position of the control rods by an appropriate bi-directional movement of the two functional groups of the rods chosen. Whereas the magnitude of the flux excursion depends operationally on the number of control rods chosen for each functional group core, the time behaviour of the excursion depends on the rapidity with which the rods are moved and on the depth of insertion into the reactor.

At any rate it is seen that opening the reactor vessel and turning around the control rods to prepare pre-sets of the rods is no longer necessary, and radiation hazards are avoided.

Figure 2:
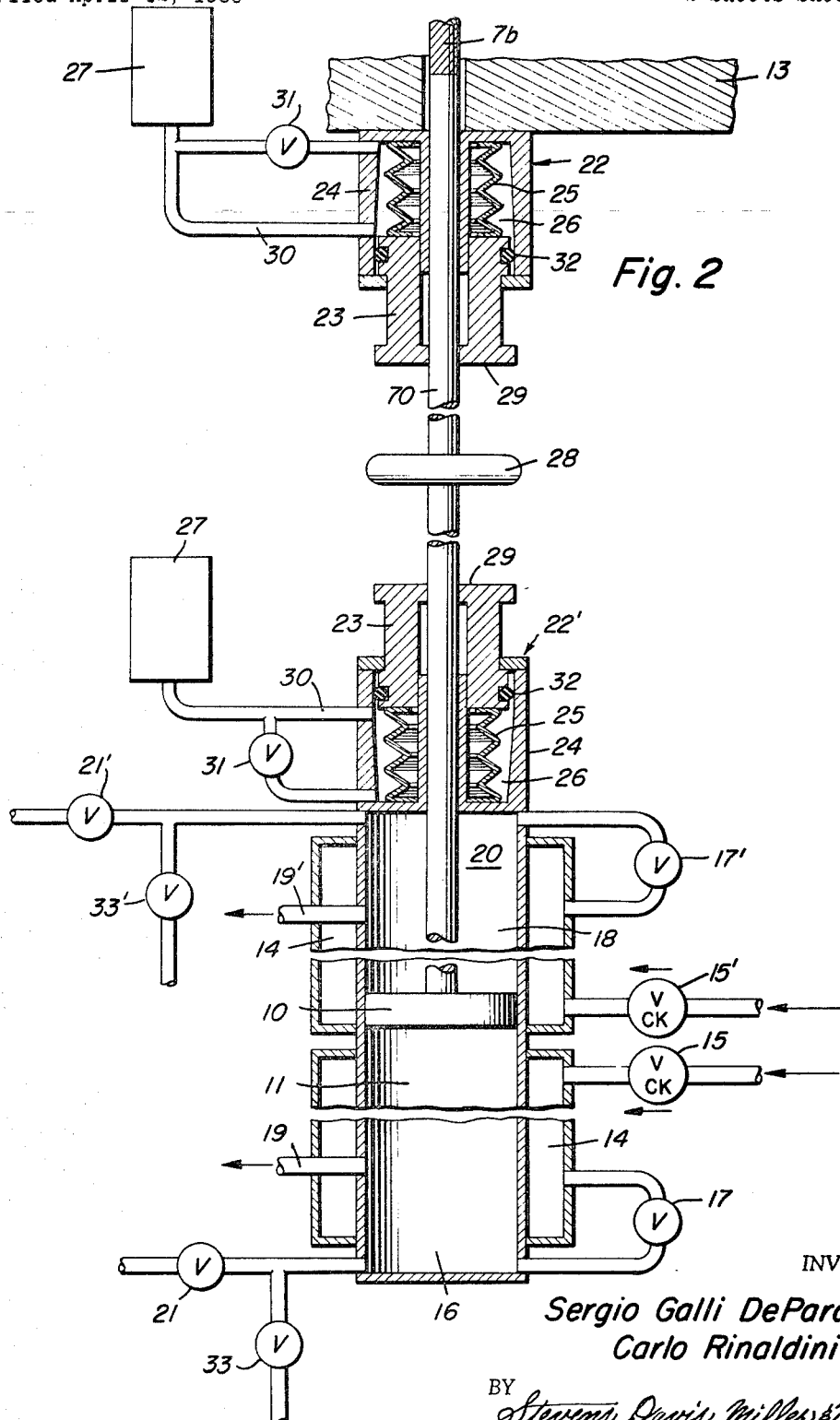

The present invention will now be described in detail with reference to the accompanying drawing wherein:

FIG. 1 is a schematic representation of the excursion reactor with the control rod system incorporated and FIG. 2 is a schematic representation of a bi-directional drive device for a control rod.

In FIG. 1 a gas-tight pressure vessel 1 of stainless steel encloses the reactor core 2 constituted of the graphite moderated fissile zone 3 and the graphite reflector blocks 4 and 5. The fuel elements consist of a Zircaloy-canned graphite matrix, in which ceramic uranium particles as nuclear fuel are uniformly dispersed. Channels 6 are provided in the core for the passage of the control rods 7. Likewise coolant passages are provided, but omitted in the drawing for the sake of clarity. Helium is circulated through the reactor core, entering through the inlet duct 8 and leaving the vessel through outlet duct 9.

The reactor vessel though cylindrical in shape is slotted alongside at one side (not seen) in a vertical radial plane beginning from the outer surface of the vessel and ending at the vessel axis inclusively. Slot walls form an integral part with the vessel wall and constitute some sort of an open pocket, in which the experiment with its associated measuring cables and instruments are inserted. The experiment, for instance a nuclear fuel element to be checked, is positioned at the inner end of the slot, that is to say, in the axis of the vessel and thus, in the axis of the reactor core where the neutron flux is at maximum.

Each control rod is composed of three portions: the neutron absorbing section $7a$, the neutron moderating section $7b$, and the spindle $7c$. The spindles terminate in plunger 10 sliding in drive or expansion cylinders 11, the construction of which is more clearly shown in FIG. 2. The drive cylinders are mounted in the lower gas tight vessel 12 under the shielding wall 13 interposed between the vessels. The dashpots are not represented in FIG. 1 for clearance reason.

It should be noted, that only a few of the total number of control rods present are represented in the drawing. The disposition of the control rods shown has been chosen such as to demonstrate a typical initial setting of the rods in the case, that the above mentioned pulse like neutron flux excursion shall be realized. The outer rods ($o$) serve as scram rods and remain always in their position during the experimental work unless an urgent shut down of the reactor should be imperative. The inner rods in position "down" ($i$–$d$) belong to the functional group of control rods, which inject positive reactivity into the reactor core, when pushed upwards. The inner rods in position "high" ($i$–$h$) belong to the functional group of control rods, which inject negative reactivity into the reactor core, when pushed downwards.

It is clear from this, that by presetting the control rods in different initial positions for departure with respect to what neutron sensitive section is within the core, different transient ramps of the power excursion can be realized. The development of the excursion depends on the predetermined movements carried out by the control rods.

Excursion experiments can be automated by proper programming of the drive devices working sequence.

With reference to FIG. 2, reference numeral 11 indicates an expansion cylinder concentrically positioned with reference to upper and lower pneumatic accumulators 14, 14'. The gas in these accumulators actuate respectively the downward and upward motions. The accumulators 14, 14' are filled with compressed air or other gas through one-way supply valves 15, 15', the lower accumulator being filled up to a predetermined pressure, $P_0$ (which may be about 30 atm.). The lowermost accumulator 14 is connected to the bottom end 16 of cylinder 11 through valve 17.

The portion 18 of cylinder 11 on the upper side of piston 10 communicates with the atmosphere through vent 19'.

In its initial position referring to the upward motion, that is, the lowermost position, the control rod drive spindle $7c$ is held stationary by a known latch means, for example: electromagnetic or pneumatic. When lower valve 17 is opened and the latch means is released, the spindle $7c$ begins its upward stroke with a relatively high initial acceleration as the pressurized gas below the piston 10 expands isoentropically to the pressure $P_1$ which corresponds to the upper limit of the pre-established useful stroke. This upper limit corresponds to the vent 19 being uncovered by piston 10 and the lower portion of cylinder 11 thereafter vents therethrough.

Downstream (upwardly) of vent 19, and at the end of the useful stroke, main piston 10 encounters the resistance offered by gas being compressed within the portion 20 of cylinder 11 which is above piston 10, portion 20 and piston 10 thereby acting as a pneumatic dampener with the piston stroke, which is regulated by valve 21', being opposed in its final phase by the braking action of the upper hydraulic dampener 22 located externally of cylinder 11.

The upper hydraulic dampener 22 is constituted by a dampener piston 23 in the form of an annular member, this being necessary in order to permit spindle $7c$ to pass therethrough. Spindle $7c$ is integral with control rod portions $7a$–$7b$. The hydraulic dampener is further constituted by cylinder 24 and by spring 25 having a minimum spring constant, said spring being immersed in an oil chamber 26.

Spring 25 urges the piston 23 to return downwardly and also the oil to flow from oil reservoir 27 into chamber 26 during the rest condition of the apparatus.

At the end of the upward stroke, the residual kinetic energy in the moving masses is therefore transmitted to the dampening means 22 by virtue of circular plate 28, which is rigidly attached to spindle $7c$, abutting against the radial face 29 of piston 23. This kinetic energy is thereby dissipated in the form of work required to force the oil from chamber 26 into the tank 27, via the oil release 30 in regulating valve 31.

The chamber 26 is slightly conical in longitudinal section for this purpose, to permit the oil to be driven into tank 27 by O-ring 32.

Since control rod $7a$, $7b$ and spindle $7c$ are both bi-directionally movable, a second hydraulic dashpot 22' analogous to means 22 is provided to function during the downward movement of spindle $7c$. Means 22' is located immediately above the compression cylinder and identical reference numerals indicate identical analogous parts in the two means 22 and 22'.

It should be noted that the lower damper 22' is arranged upon the upper head of cylinder 11 while means 22 is arranged near to the upper end of spindle $7c$ and is attached to the roof of the tight container beneath the reactor core.

A characteristic of this invention is that it is possible, in addition to bi-directional movements, to have fast, slow, and decelerating movements.

For decelerating movement, for example, in an upwardly direction, the upper chamber 18 in cylinder 11 is completely filled with a viscous fluid such as an oil the upper discharge opening 19 is closed to the atmosphere, and the upper valve 17' is also closed. The succeeding operations are analogous to those aforementioned which are applicable in the case of fast movement. The decelerating movement is effected through the discharge of oil from the upper chamber 18 of the compression cylinder through valve 33' which is variable operable to provide any desired degree of opening.

Valve 33' may be substituted by a group of valves, which would provide a variable opening and variable amount of slowing down, depending upon the valve or combination of valves employed to discharge the oil from the compression chamber.

Valve 31 regulates the hydraulic damper and permits the spindle 7c to reach the end of its stroke while adapting the damping action to the amount of kinetic energy in the moving masses, this logically being different from the values existing during the fast motions.

Slow motions may be imparted to the spindle 7c by coupling it to a motor-driven lead screw mechanism through an electromagnetic coupling. One of two or three different speed values may be selected for driving the control rod simply by changing the pole number of the three-phase driving motor. The motor is connected with a gear box which also contains the mechanism for a control rod position-indicating system. The coupling could be of circular shape and be engageable about the plate 28. The coupling would be energized to engage the plate 28 for fine positioning of the control rod 7a, 7b and the coupling would be quickly disengageable in order to effect rapid rod insertion.

It is to be understood that the above description relating to a preferred embodiment of the invention is given herein only for purposes of illustration and not for purposes of limitation, the invention being susceptible to various obvious modifications and, therefore, being limited only by the scope of the following claims.

We claim:

1. A system for effecting bi-directional, variable speed movement of control rods in nuclear power excursion reactors of the type having a core enclosed in a gas tight pressure vessel, comprising, a plurality of control rods consisting of two consecutive sections of different neutron sensitive material affecting the neutron flux in an inverse manner all of the control rods in said system being identical to each other, each of said control rods being disposed at the same side of the reactor core with the sections of different neutron sensitive material placed in the same sequence and permanently attached to push and pull spindles penetrating into the reactor vessel, said core including channels in which said control rods are guided, a plurality of control driving means disposed on one side of said reactor for driving each of said control rods upward and downward at either an accelerating speed, a speed slower than said accelerating speed, or a decelerating speed in either of opposite axial directions, each of said control driving means being respectively connected only to the spindle of respective different ones of said control rods so that each rod is controlled by only one corresponding control means, each of said neutron sensitive sections having a height corresponding to the height of the reactor core, said spindle having a stroke adapted to the height of said reactor, whereby at each of the extreme driven positions of a control rod, one neutron sensitive section of the control rod is inserted entirely within the core.

2. A system as defined in claim 1, wherein said control driving means includes, a drive means to move said spindle in either of opposed directions, and dampening means to brake the movement of said spindle in either of said opposed directions.

3. A system as defined in claim 2, wherein said drive means comprises, a main cylinder, a main piston slidable within said cylinder, said piston rigidly connected to said spindle, a compressed gas inlet communicating with one end of said cylinder, and a vent opening intermediate said gas inlet and the other end of said cylinder.

4. A system as defined in claim 3, wherein said drive means includes a first and second pneumatic accumulator, said first accumulator connected to said gas inlet and said second accumulator connected to the other end of said cylinder.

5. A system as defined in claim 2, wherein said dampening means comprises a first and a second hydraulic dampener coaxially positioned relative to said spindle, said dampeners respectively adapted to brake the spindle movement in one of said opposite spindle directions.

6. A system as defined in claim 5, wherein each of said dampeners includes an oil-filled cylinder concentrically positioned about said spindle, an annular piston slidable within said oil-filled cylinder, said spindle passing through a bore in said annular piston, an oil-filled clearance space between the outer wall of said annular piston and the inner wall of said oil-filled cylinder, a surge tank and conduits connecting said surge tank to axially spaced portions of said oil-filled cylinder, and means for transmitting kinetic energy from said spindle to said annular piston.

7. A system as defined in claim 6, wherein the last-mentioned means comprises a stop plate rigidly mounted on said spindle intermediate its ends, and a radial surface on each of said annular pistons, said plate being adapted to abut against said radial surface.

8. A system as defined in claim 6, including spring means resiliently biasing said annular pistons in a retracted position relative to said oil-filled cylinder.

9. A system as defined in claim 3, including means to close said vent opening, a variable operable outlet means communicating with the other end of said cylinder, the portion of said main cylinder between said other end and said main piston containing a viscous fluid, said fluid being dischargeable through said variably operable outlet means.

References Cited

UNITED STATES PATENTS

| | | | |
|---|---|---|---|
| 2,899,936 | 8/1959 | Edmund | 92—143 |
| 2,975,119 | 3/1961 | Emmons | 176—36 |
| 2,982,710 | 5/1961 | Leyse et al. | 176—86 |
| 2,991,760 | 7/1961 | Rhine | 91—355 |
| 3,020,887 | 2/1962 | Hobson et al. | 176—36 |
| 3,048,532 | 8/1962 | Thorp | 176—86 |
| 3,162,578 | 12/1964 | Allen | 176—36 |
| 3,198,709 | 8/1965 | MaComber | 176—36 |
| 3,208,914 | 9/1965 | Dickson | 176—36 |
| 2,920,025 | 1/1960 | Anderson | 176—65 |

OTHER REFERENCES

AEC-Document, AN–174, December 1961, pp. 10, 17–23.

CARL D. QUARFORTH, *Primary Examiner.*

H. E. BEHREND, *Assistant Examiner.*